(12) United States Patent
Aritomi et al.

(10) Patent No.: US 7,865,022 B2
(45) Date of Patent: Jan. 4, 2011

(54) INFORMATION PROCESSING APPARATUS, IMAGE PROCESSING APPARATUS, CONTROL METHOD, AND COMPUTER READABLE STORAGE MEDIUM

(75) Inventors: Masanori Aritomi, Tokyo (JP); Hiroshi Oomura, Yokohama (JP); Yasuhiro Kujirai, Maidenhead (GB); Yoshihiro Takagi, Yokohama (JP); Tatsuro Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1008 days.

(21) Appl. No.: 11/467,477

(22) Filed: Aug. 25, 2006

(65) Prior Publication Data

US 2007/0047826 A1     Mar. 1, 2007

(30) Foreign Application Priority Data

Aug. 31, 2005   (JP)   ............................. 2005-252190

(51) Int. Cl.
*G06K 9/36*   (2006.01)
(52) U.S. Cl. ...................................... 382/232; 708/203
(58) Field of Classification Search .................. 382/232, 382/239; 708/203
See application file for complete search history.

(56) References Cited

U.S. PATENT DOCUMENTS

| 5,818,966 A * | 10/1998 | Prasad et al. ................. 382/232 |
| 2004/0065739 A1 * | 4/2004 | Xu et al. ................... 235/462.1 |

FOREIGN PATENT DOCUMENTS

| JP | 2001-197297 A | 7/2001 |
| JP | 2001-346033 A | 12/2001 |
| JP | 2002-002916 A | 1/2002 |

* cited by examiner

*Primary Examiner*—Vikkram Bali
*Assistant Examiner*—Eueng-Nan Yeh
(74) *Attorney, Agent, or Firm*—Canon U.S.A., Inc. IP Division

(57) ABSTRACT

An image processing apparatus includes a decision unit configured to determine whether or not print image data includes copy-forgery-inhibited-pattern image data. Based on a decision result of the decision unit regarding whether or not the print image data includes the copy-forgery-inhibited-pattern image data, a processing unit of the image processing apparatus is configured to determine whether first compression processing is to be performed or second compression processing is to be performed and apply the decided compression processing to the print image data.

3 Claims, 16 Drawing Sheets

LATENT IMAGE PATTERN DATA

BACKGROUND IMAGE PATTERN DATA

LATENT IMAGE
PATTERN DATA

BACKGROUND IMAGE
PATTERN DATA

LATENT IMAGE
PATTERN DATA

BACKGROUND IMAGE
PATTERN DATA

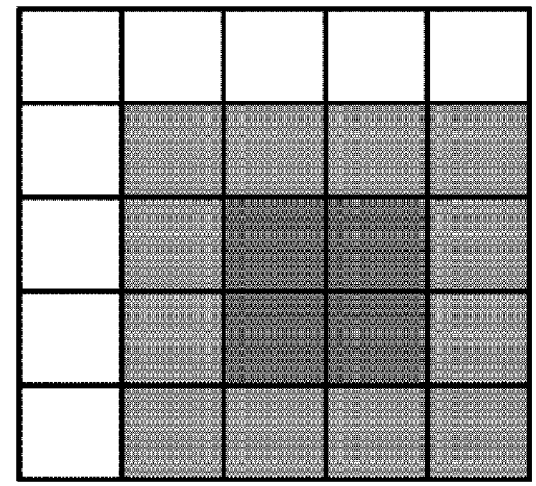
FIG.16A  LATENT IMAGE PATTERN DATA
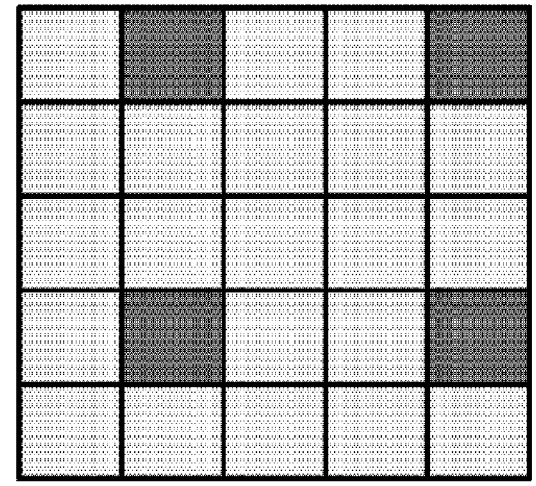
FIG.16B  BACKGROUND IMAGE PATTERN DATA

INFORMATION PROCESSING APPARATUS, IMAGE PROCESSING APPARATUS, CONTROL METHOD, AND COMPUTER READABLE STORAGE MEDIUM

BACKGROUND OF THE INVENTION

1. Field of the Invention

The present invention generally relates to a computer and other information processing apparatus, a control method for the information processing apparatus, a multifunction peripheral and other image recording apparatus, a control method for the image recording apparatus, a program, and a computer readable storage medium. The invention more particularly relates to processing of print data including information embedding binary image data, such as copy-forgery-inhibited-pattern image data.

2. Description of the Related Art

In the field of document management and security improvement, there is a conventional technique capable of embedding a specific pattern (or sign) on a physical paper, such as a cfip (copy-forgery-inhibited-pattern) image, two-dimensional bar code image, and a digital watermark image.

For example, as discussed in Japanese Patent Application Laid-open No. 2001-197297 and Japanese Patent Application Laid-open No. 2002-002916, a printer driver of a host computer can produce cfip image data. According to the Japanese Patent Applications, an application software of the host computer can produce document data. Then, the host computer transmits the document data and the cfip image data to a printer. The printer combines the original document data and the cfip image data and outputs a printed image.

As discussed in Japanese Patent Application Laid-open No. 2001-197297, the cfip image includes a latent image and a background image which are substantially identical with each other in reflection density on a sheet (paper). However, when the sheet is copied, the reflection density of the latent image can exceed the reflection density of the background image.

To provide two images (i.e., latent image and background image) having the aforementioned relationship, the background image can be composed of numerous small dots (for example, those having a size equal to or less than 42 μm×42 μm), while the latent image can be composed of a relatively small number of large dots (for example, those having a size equal to or greater than 126 μm×126 μm).

The reproduction ability of each copying machine is generally limited. That is, it is more difficult for a copying machine to clearly reproduce small dots on a sheet when copied, compared to larger dots.

Therefore, when a copying machine copies a sheet including a cfip image, a background image constructed by small dots tends to become unclear (tends to disappear). On the other hand, the copying machine can clearly reproduce a latent image constructed by large dots.

Therefore, even though the latent image and the background image are equalized in reflection density on a sheet in an initial state, the reflection density of the latent image exceeds the reflection density of the background image when copied on a sheet.

The cfip image utilizes the aforementioned phenomenon. For example, an official resident's card obtainable from a municipal office can include a cfip image, so that a character string such as "invalid" can appear when the official resident's card is copied.

In general, the data required for forming a latent image on a sheet can be referred to as latent image data. And, the data required for forming large dots of a latent image on a sheet can be referred to as latent image pattern data. FIG. 15A shows practical latent image pattern data usable for forming a black cfip image. In the drawings, a black pixel represents a pixel having a pixel value of (R,G,B)=(0,0,0) or (C,M,Y,K)=(0,0,0,255). On the other hand, a white pixel represents a pixel having a pixel value of (R,G,B)=(255,255,255) or (C, M,Y, K)=(0,0,0,0).

Furthermore, the data required for forming a background image on a sheet can be referred to as background image data. And, the data required for forming small dots of the background image on the sheet can be referred to as background image pattern data. FIG. 15B shows practical background image pattern data usable for forming the black cfip. Similar to FIG. 15A, a black pixel has a pixel value of (R,G,B)=(0,0,0) or (C,M,Y,K)=(0,0,0,255). And, a white pixel has a pixel value of (R,G,B)=(255,255,255) or (C, M,Y,K)=(0,0,0,0).

More specifically, the cfip image data can include black cfip image data, cyan cfip image data, and magenta cfip image data. In any cfip image data, pixels constituting the cfip image data have a binary value. For example, each pixel constituting the cyan cfip image data is a cyan pixel or a white pixel. The cyan pixel has a pixel value of (R,G,B)=(0,255,255) or (C,M,Y,K)=(255,0,0,0). The white pixel has a pixel value of (R,G,B)=(255,255,255) or (C,M,Y,K)=(255,0,0,0).

The data indicating the position of dots (more specifically, having no information with respect to any intermediate color) can be referred to as binary image data. The cyan cfip image data is binary image data of cyan. The above-described black cfip image data is binary image data of black.

Furthermore, a 2-dimensional code is known as an extended code of a conventional one-dimensional bar code. The 2-dimensional code can include information of vertical and lateral directions. For example, QR Code (registered trademark) is generally known and widely used as a standardized 2-dimensional code (refer to Japanese Patent Application Laid-open No. 2002-002916).

An application of a host computer can produce 2-dimensional code data and original document data and can transmit the produced data to a multifunction peripheral. The multifunction peripheral can combine these data and produce a printed image.

The 2-dimensional code data is black-and-white binary image data. The aforementioned cfip image data, two-dimensional code data, bar code data, and digital watermark data can be collectively referred to as "information embedding binary image data."

The following description includes technical terms defined in the following manner.

Print job data: defined as job data including tag data and print data.

Print data: indicating bit map data to be produced, and expressed in terms of page description language (PDL).

Original document data: created by an application, such as WORD (trademark) or EXCEL (trademark), and including no information embedding binary image data.

Tag data: added as additional information to print data, and including instruction such as "execute printing by 2 in 1", "transmit print data", and "store print data", or message such as "print data includes information embedding binary image data." Tag data is "an instruction to multifunction peripheral" other than the print data.

Image: existing on a sheet or a display as picture or illustration.

Image data: used for expressing an image on a sheet or a display, for example, as bit map data, wherein when specific data is defined in the concept of "image data," appropriate leading wording corresponding to the specific data is added to the "image data," as shown by the following examples.

Binary image data: defined as image data constituted by pixels having pixel values 0 and 255 only (when the range of the pixel value is 256).

Cfip image data: defined as bit map data used when cfip image is formed on a sheet.

Bar code data: defined as bit map data used when a bar code is formed on a sheet.

Two-dimensional code data: defined as bit map data used when a two-dimensional code is formed on a sheet.

Digital watermark data: bit map data used for forming a digital watermark on a sheet.

The multifunction peripherals are usually configured to separate print data from print job data received and convert the print data into bit map image data, and then apply lossy compression to the bit map image data. Performing the lossy compression in this manner can reduce a memory capacity to be allocated to the bit map image data. Accordingly, the remaining memory capacity can be effectively used for other processing (e.g., copy processing, storage processing, and data transmission/reception processing).

In other words, the above-described multifunction peripherals can increase a memory capacity available for the other aforementioned processing. Thus, the above-described multifunction peripherals can simultaneously execute the print processing and other processing.

Securing a sufficient amount of memory capacity available for two or more processing to be executed simultaneously also provides the following advantages.

For example, when the multifunction peripheral receives print job data including a very large page number of image data, the multifunction peripheral can smoothly process the print job data, producing lossy compressed image data and capable of storing the produced image data in a memory due to a sufficient amount of memory capacity available. As a result, the throughput of the multifunction peripheral can be improved.

As described above, the multifunction peripheral performs the lossy compression processing to reduce the data size of image data on one hand and to speedily execute two or more processing to be simultaneously performed on the other hand.

The JPEG compression is characteristic in mainly ignoring high frequency components. When a compression rate of the JPEG compression is set to high, most of high frequency components are omitted. Therefore, if the JPEG compression is applied to the binary image data containing independent dots (small regions having the density value 255), high frequency components are removed and an obtainable image will be dull. In one context, the small region is defined as, for example, a region containing a small pixel number, such as 1×1 pixel (having the size of approximately 42 um×42 um at 600 DPI), 2×2 pixels, or 3×3 pixels.

If the JPEG compression (lossy compression) is applied to binary image data, binary image data may be deteriorated severely and some of the information may possibly disappear. If information embedding binary image data deteriorates as a result of a compression process, some or all of the information associated with the embedded binary image data may be lost. If the compression rate of the JPEG compression (lossy compression) is set to very low, binary image data will not deteriorate as much. However, the size of data resulting from such JPEG compression (lossy compression) will be larger because the binary image data will include many high frequency components.

Detailed description with respect to the above-described problem will be given below with reference to latent pattern data and background pattern data.

FIG. 16A is a view illustrating dull latent pattern data resultant from lossy compression and expansion applied to the latent pattern data shown in FIG. 15A. FIG. 16B is a view illustrating dull background pattern data resulting from lossy compression and expansion applied to the background pattern data shown in FIG. 15B.

FIG. 12A is a view illustrating an example of imperfect latent pattern data obtainable from binarization processing applied to the "dull" latent pattern data shown in FIG. 16A. As understood from FIG. 12A, the data to be used for forming large dots on a sheet are undesirably converted into the data used for forming medium dots or small dots on the sheet.

FIG. 12B is a view illustrating an example of imperfect background pattern data obtainable from binarization processing applied to the "dull" background pattern data shown in FIG. 16B. As understood from FIG. 12B, the data to be used for forming small dots on a sheet are undesirably converted into the data used for forming medium dots or small dots on the sheet.

In this manner, when both the latent pattern data and the background pattern data include medium dots and small dots, the cfip image data produced from these pattern data may not be discriminated as cfip image data. Thus, when a sheet containing cfip image data printed thereon is copied, character string such as "invalid" may not appear on its duplicate.

As described with reference to the examples of cfip image data, when lossy compression is applied to binary image data, the dots may not be accurately positioned and as a result the intended information may not be properly embedded into binary image data. More specifically, in the case of cfip image data, character string may not properly appear on a duplicate in a visible state. In the case of digital watermark data, bar code, or two-dimensional code, a code reader or a watermark reader may not be able to properly read the information on a duplicate.

Therefore, it is desired to provide an information processing apparatus configured to apply lossy compression to image data so that cfip image data combined with original document data can be properly printed, and it is desired to provide a related control method for the information processing apparatus.

Furthermore, it is desired to provide an image processing apparatus configured to perform lossy compression applied to ordinary image data to simultaneous execute two or more processing or to speedily execute each processing and also configured to suppress deterioration of information relating to cfip image data (or composite image data including cfip image data and original document data). It is also desired to provide a related control method for the image processing apparatus.

SUMMARY OF THE INVENTION

Embodiments of the present invention are directed to a technique capable of overcoming or at least mitigating the above-described problems.

According to an aspect of the present invention, at least one exemplary embodiment is directed to an image processing apparatus including a decision unit and a processing unit. The decision unit is configured to determine whether or not print image data includes copy-forgery-inhibited-pattern image data. Based on a decision result of the decision unit regarding whether or not the print image data includes the copy-forgery-inhibited-pattern image data, the processing unit is configured to determine whether first compression processing is to be performed or second compression processing is to be performed, and apply the decided compression processing to the print image data.

According to another aspect of the present invention, at least one exemplary embodiment is directed to an information processing apparatus including a print data production unit, an additional information production unit and a transmission unit. The print data production unit is configured to produce print data including original document data and copy-forgery-inhibited-pattern image data which are combinable with each other. The additional information production unit is configured to produce additional information indicating that the print data includes the copy-forgery-inhibited-pattern image data so that compression processing causing less deterioration in image quality can be applied to composite image data produced from the original document data and the copy-forgery-inhibited-pattern image data contained in the print data. The transmission unit is configured to transmit print job data that includes the print data produced from the print data production unit and the additional information produced from the additional information production unit.

According to another aspect of the present invention, at least one exemplary embodiment is directed to a method for an image processing apparatus including determining whether print image data includes copy-forgery-inhibited-pattern image data, and selecting first compression processing or second compression processing based on the determination of whether the print image data includes the copy-forgery-inhibited-pattern image data. The method further includes performing the selected compression processing to the print image data.

According to another aspect of the present invention, at least one exemplary embodiment is directed to a method for an image processing apparatus including producing print data including original document data and copy-forgery-inhibited-pattern image data which are combinable with each other, and producing additional information indicating that the print data includes the copy-forgery-inhibited-pattern image data so that compression processing causing less deterioration in image quality can be applied to composite image data produced from the original document data and the copy-forgery-inhibited-pattern image data contained in the print data. The method further includes transmitting print job data that includes the print data and the additional information.

According to another aspect of the present invention, at least one exemplary embodiment is directed to a computer readable storage medium storing computer-executable instructions which, when executed by an image processing apparatus, causes the image processing apparatus to perform operations including: determining whether print image data includes copy-forgery-inhibited-pattern image data; selecting first compression processing or second compression processing based on the determination of whether the print image data includes the copy-forgery-inhibited-pattern image data; and performing the selected compression processing to the print image data.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 16A is a view illustrating exemplary latent pattern data resulting from lossy compression and expansion.

FIG. 16B is a view illustrating exemplary background pattern data resulting from lossy compression and expansion.

DETAILED DESCRIPTION OF THE EMBODIMENTS

Figure 1:
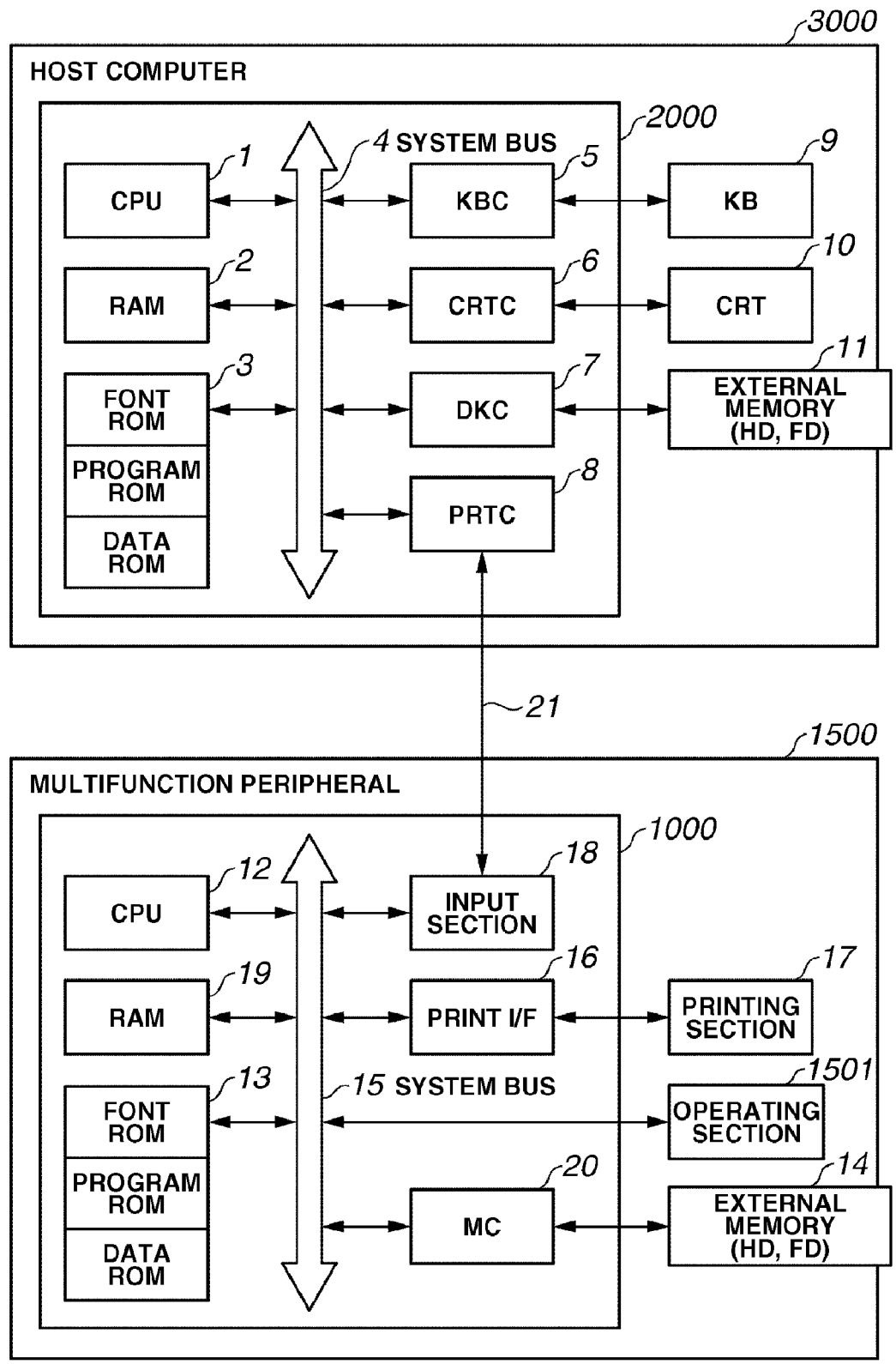
FIG. 1 is a block diagram illustrating an arrangement of a printing system in accordance with an exemplary embodiment.

The following description of exemplary embodiments is merely illustrative in nature and is in no way intended to limit the invention, its application, or uses.

Processes, techniques, apparatus, and materials as known by one of ordinary skill in the art may not be discussed in detail but are intended to be part of the enabling description where appropriate.

For example, certain circuitry for signal processing and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is defined in one figure, it may not be discussed for following figures.

Exemplary embodiments will be described in detail below with reference to the drawings.

First Exemplary Embodiment

FIG. 1 shows a printing system in accordance with a first exemplary embodiment, which includes a host computer and a multifunction peripheral, although the present invention is not limited to the embodiment.

The functions of the present exemplary embodiment can be realized by a single device or a system including a plurality of devices. Furthermore, the printing system of the present exemplary embodiment can be applied to a processing system connected via a network such as LAN (local area network) or WAN (wide area network).

Arrangement of Printing System

A host computer 3000 includes a CPU 1, a RAM 2, a ROM (read only memory) 3, a keyboard controller (KBC) 5, a CRT controller (CRTC) 6, a disk controller (DKC) 7, and a multifunction peripheral controller (PRTC) 8, which are mutually connected via a system bus 4.

The CPU 1 can execute the following controls based on an original document processing program and the like stored in a program ROM of the ROM3 or in an external memory 11.

More specifically, the CPU 1 can produce an original document including figures, graphics, images, letters, tables (including calculation tables) and others, resulting from the processing relating to later-described exemplary embodiments, and can control print processing for reproducing a document.

The CPU 1 can manage an overall control of respective devices connected to the system bus 4. Furthermore, the program ROM of the ROM3 or the external memory 11 can store an operating system (hereinafter, referred to as "OS"). Furthermore, a font ROM of ROM3 or the external memory 11 can store font data usable when the document is produced. Furthermore, a data ROM of ROM3 or the external memory 11 can store various data usable when the document is produced. The RAM 2 can function as a main memory or a work area for the CPU 1.

The keyboard controller (KBC) 5 can control a key input entered by a user through a keyboard 9 or a pointing device (not shown). The CRT controller (CRTC) 6 can control a display of the CRT display (CRT) 10, including a display of a copy-forgery-inhibited-pattern (hereinafter, referred to as "cfip") image. The disk controller (DKC) 7 can control an access to the external memory 11 such as a hard disk (HD) or a floppy (registered trademark) disk (FD).

The external memory 11 can store a boot program, various applications, font data, user files, edit files, and a multifunction peripheral control command producing program (hereinafter, referred to as a "MFP driver").

The multifunction peripheral controller (PRTC) 8, connected to a multifunction peripheral 1500 via a bidirectional interface (I/F) 21, can execute communication control processing for the communication between the host computer 3000 and the multifunction peripheral 1500.

The CPU 1 can open various windows, which are registered beforehand, according to a command instructed by a user through a mouse cursor (not shown) displayed on the CRT 10, and can execute various data processing. Thus, the CPU 1 enables a user to open a window relating to print settings when a printing operation is required. For example, the print settings include the settings for the multifunction peripheral and the settings for the MFP driver that enables a user to select a print mode and determine a print processing method.

The multifunction peripheral 1500 includes a CPU 12, a RAM 19, a ROM 13, an input section 18, a print I/F 16, an operating section 1501, and a memory controller (MC) 20, which are mutually connected via a system bus 15. More specifically, the CPU 12 can control an overall operation of the multifunction peripheral 1500 based on a control program stored in the ROM 13 or based on a control program stored in the external memory 14.

Furthermore, the CPU 12 can output an image signal as print output information resulting from the overall control to a printing section (i.e., a multifunction peripheral engine) 17 connected to the system bus 15.

A program ROM of the ROM 13 can store a control program of the CPU 12. Furthermore, a font ROM of the ROM 13 can store font data usable when the print output information is produced. Furthermore, a data ROM of the ROM 13 can store information usable on a computer, if the multifunction peripheral is not equipped with a hard disk or other external memory.

The CPU 12 can communicate with the computer via the input section 18. Thus, the information stored in the multifunction peripheral 1500 can be transmitted to the host computer 3000. The RAM 19 can function as a main memory or a work area for the CPU 12. Furthermore, an optional RAM (not shown) connectable to an expansion port can be used to increase the memory capacity. The RAM 19 can be used as an output information expansion region, an environmental data storing region, or an NVRAM.

The external memory 14, such as a hard disk (HD) or an IC card, can control an access to the memory controller (MC) 20. The external memory 14, which is optionally connectable to the multifunction peripheral 1500, can store font data, emulation program, and format data.

If necessary, the multifunction peripheral 1500 can include an NVRAM (not shown) to store multifunction peripheral mode setting information entered from the operating section 1501.

The printing section 17 is an electro-photographic engine, according to the present exemplary embodiment. Therefore, the printing section 17 can finally record the image data including cfip image data with dots of a toner on a paper or a comparable recording medium.

The printing section 17 according to the present exemplary embodiment is not limited to the electro-photographic type. For example, the printing section 17 can be an inkjet printer which can form an image of dots or any other printing apparatus.

Figure 2:
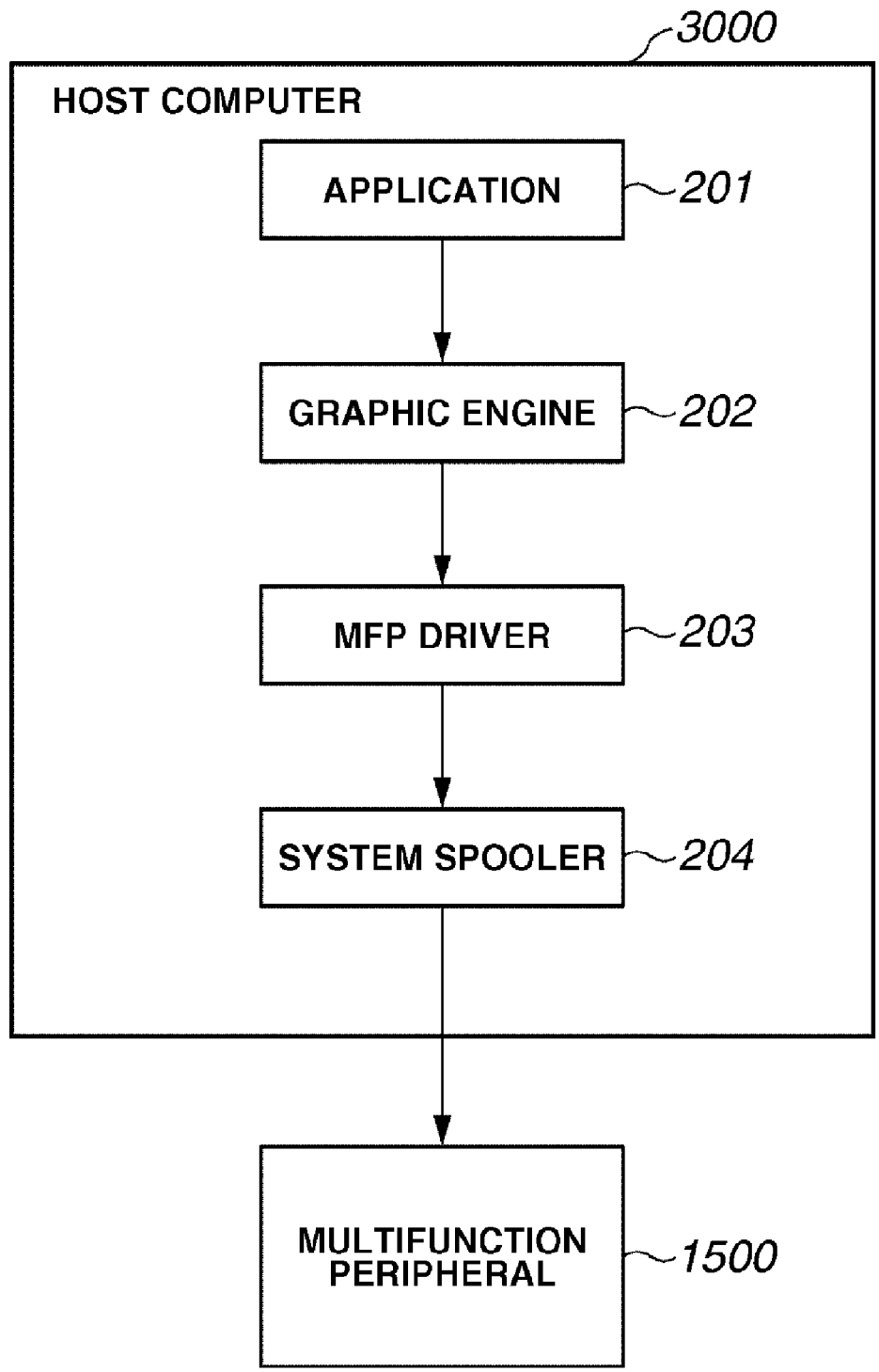
FIG. 2 is a block diagram illustrating an exemplary arrangement for the print processing performed by a host computer shown in FIG. 1 in accordance with an exemplary embodiment.

FIG. 2 is a block diagram illustrating an exemplary arrangement for the print processing performed by the host computer 3000 shown in FIG. 1 in accordance with an exemplary embodiment. FIG. 2 shows an application 201, a graphic engine 202, a multifunction peripheral driver (referred to as "MFP driver") 203, and a system spooler 204, which are files storable in the external memory 11. In other words, the application 201, the graphic engine 202, the MFP driver 203, and the system spooler 204 can be loaded into the RAM 2 and executed by the OS or its module.

Furthermore, the application 201 and the MFP driver 203 can be stored into the FD of the external memory 11 (or CD-ROM (not shown)), or can be stored into the HD of the external memory 11 via a network (not shown). The application 201 stored in the external memory 11 can be loaded into the RAM 2 and executed by the OS or its module. When the application 201 instructs a printing operation to the multifunction peripheral 1500, the graphic engine 202 loaded in the RAM 2 can execute image output processing.

The graphic engine 202 can access the external memory 11 to load the MFP driver 203 into the RAM 2. The MFP driver 203 is prepared beforehand for each printing apparatus (e.g., multifunction peripheral). The graphic engine 202 can set an output of the application 201 to the MFP driver 203.

Furthermore, the graphic engine 202 can convert a GDI (Graphic Device Interface) function received from the application 201 into a DDI (Device Driver Interface) function. And, the graphic engine 202 can output the DDI (Device Driver Interface) function to the MFP driver 203. The MFP driver 203 can convert the output of the application 201, based on the DDI function received from the graphic engine 202, into a control command, such as a PDL (Page Description Language) which the multifunction peripheral can recognize.

The converted multifunction peripheral control command can be outputted as print data to the multifunction peripheral 1500, via the system spooler 204 loaded into the RAM 2 by the OS, and via the interface 21.

Figure 3:
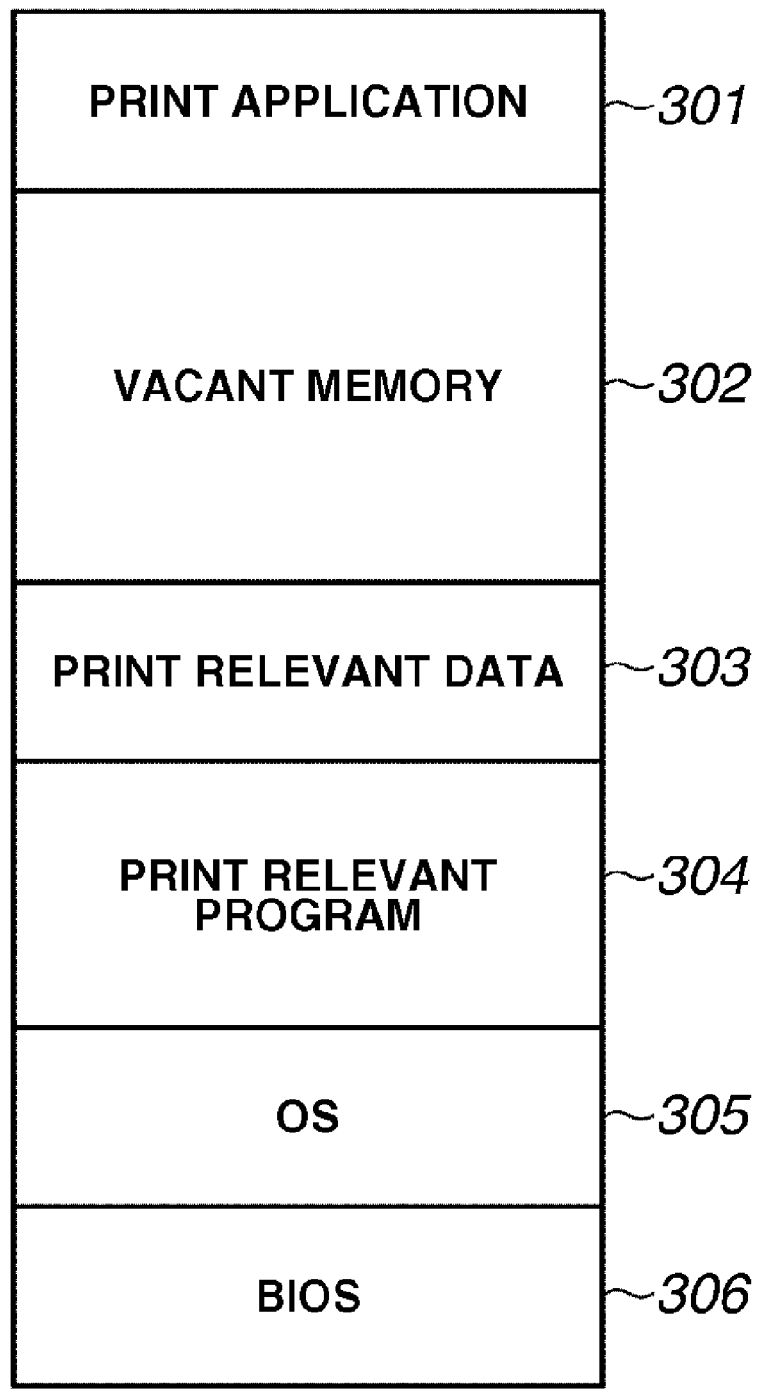
FIG. 3 is a diagram illustrating a memory map of the host computer shown in FIG. 1 in accordance with an exemplary embodiment.

FIG. 3 shows a memory map in a state of a print relevant module including a print program which is loadable into the RAM 2 and executable by the host computer 300. As shown in FIG. 3, the print relevant module includes print application 301, vacant memory 302, print relevant data 303, print relevant program 304, OS 305, and BIOS 306. In the present exemplary embodiment, the print relevant program 304 includes a print control program.

The present exemplary embodiment executes a sequential procedure including production of print job data (including binary image data used for embedding information) and transmission of the produced print job data. In the present exemplary embodiment, the information embedding binary image is copy-forgery-inhibited-pattern image (i.e., cfip image).

First, the application creates original document data. When a user instructs printing of the created original document data, the MFP driver is actuated to display an MFP driver screen on the UI. The user can select a desirable multifunction peripheral or can determine print settings, using the MFP driver screen. Furthermore, the user can select a cfip print mode or a digital watermark print mode, or can select a 2-dimensional code print mode.

The cfip image print mode enables a user to obtain a composite print including cfip image data and original document data. Furthermore, the digital watermark print mode enables a user to obtain a composite print including digital watermark data and original document data. Furthermore, the 2-dimensional code print mode enables a user to obtain a composite print including 2-dimensional code data and original document data.

When the user's instructions for the print settings and the selection of the cfip image print are finalized on the printer driver screen, the MFP driver starts the following processing.

First, the MFP driver produces cfip image data. Then, the MFP driver produces the print data based on the produced cfip image data and the original document data received from the application via the OS. Furthermore, the MFP driver produces print job data with tag data added (related) to the print data. Then, the MFP driver requests the OS to transmit the produced print job data. As a result, the host computer can transmit the print job data to the multifunction peripheral.

Figure 4:
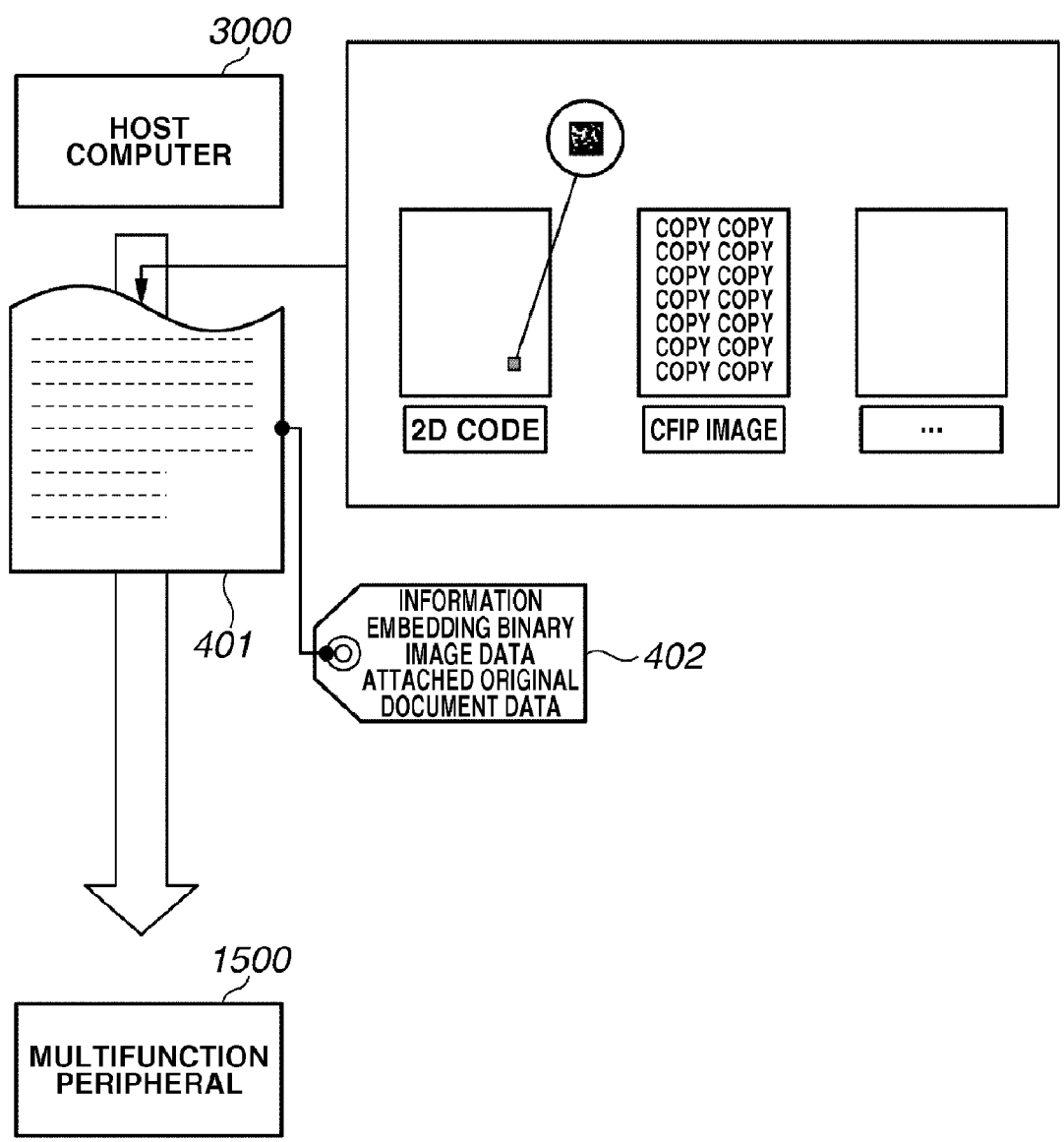
FIG. 4 is a schematic view illustrating a processing procedure of the host computer shown in FIG. 1 that can generate and output print data in accordance with an exemplary embodiment.

FIG. 4 is a view illustrating a tag 402 attached to a print data 401, used when the print data 401 is transmitted from the host computer 3000 to the multifunction peripheral 1500. The tag 402 indicates that the print data 401 includes information embedding binary image data.

The multifunction peripheral 1500 executes the following processing in response to reception of the print job data.

First, the multifunction peripheral 1500 separates the received print job data into the tag data and the print data. Furthermore, the multifunction peripheral 1500 performs settings (including setting of a lower compression rate) based on the tag data for the later-described image processing to be applied to the composite image data.

Furthermore, the multifunction peripheral 1500 interprets the print data and produces intermediate data. The intermediate data includes cfip image intermediate data and document intermediate data. Furthermore, the multifunction peripheral 1500 produces cfip image data (bit map data) from the cfip image intermediate data and document image data (bit map data) from the document intermediate data.

And, the multifunction peripheral 1500 combines the produced image data (i.e., the cfip image data and the document image data) to produce the composite image data (bit map data). Then, the multifunction peripheral 1500 performs compression processing at a lower compression rate applied to the composite image data, and stores the compressed composite image data. Furthermore, the multifunction peripheral 1500 expands the stored compressed composite image data to produce new composite image data (bit map data).

Figure 5:
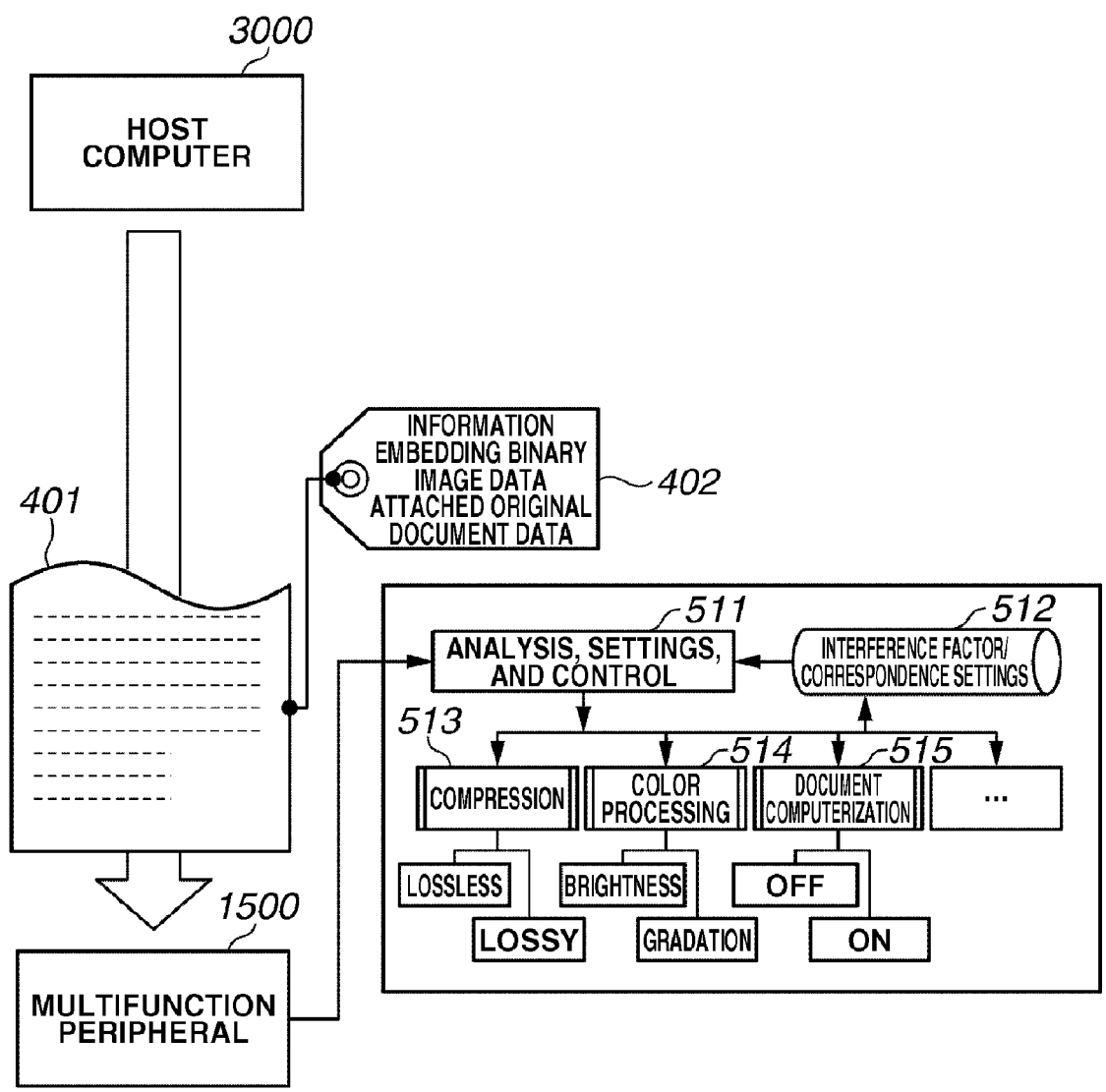
FIG. 5 is a schematic view illustrating a processing procedure of a multifunction peripheral shown in FIG. 1 that can receive and process the print data in accordance with an exemplary embodiment.

FIG. 5 is a schematic view illustrating a processing procedure of the multifunction peripheral 1500 that can receive and process the print data.

The multifunction peripheral 1500 receives the print job data, including the print data 401 and the tag data 402, from the host computer 3000. The print data 401 includes the information embedding binary image data. The multifunction peripheral 1500 executes the analysis, settings, and control processing applied to the received contents (refer to 511). As described above, in the print data 401 including the information embedding binary image data, the original document data and the information embedding binary image data are not yet combined.

In the analysis, settings, and control processing applied to the received contents, the multifunction peripheral 1500 analyzes the tag data 402 and performs the settings preferable for the image processing.

In the settings, the multifunction peripheral 1500 refers to interference factor/correspondence settings (512) on the table and changes the settings of each image processing with reference to the print data including the information embedding binary image data and the original document data.

The multifunction peripheral performs various image processing that may have adverse effects on the print data including information embedding binary image data. The image processing having adverse effects on the print data can be referred to as an interference factor.

First, in the case of compression processing (513), the interference factor is lossy compression. Furthermore, in the case of color processing (514), the interference factor is gradation priority processing. The gradation priority processing includes performing color matching processing suitable for a photo image. The color matching processing suitable for the image is generally realized by performing matching processing giving priority to the tint. If the matching processing giving priority to the tint is applied to an image, the smoothness will be improved but the saturation may decrease.

If the gradation priority processing is applied to the information embedding binary image data, part of the processed information embedding binary image data may be different from the original information embedding binary image data. Therefore, the image information embedding binary image printed on a print product may become dull and the saturation may deteriorate. The information embedding binary image may not be accurately reproduced. The interference factor of document computerization processing (515) is execution of the document computerization processing.

Accordingly, to eliminate adverse effects given by various interference factors on the information embedding binary image data, the present exemplary embodiment changes the settings of the above-described processing when the tag data 402 shows that the print job data includes information embedding binary image data in the following manner.

First, in the case of the compression processing (513), the present exemplary embodiment sets lossless compression. Furthermore, in the case of the color processing (514), the correspondence setting is brightness priority processing. The brightness priority processing is color matching processing enhancing the contrast of image data. Furthermore, in the case of the document computerization processing (515), the present exemplary embodiment prohibits execution of the document computerization processing.

The interference factors other than the above-described factors are, for example, resource or process related items, such as a capacity of a built-in memory, a concurrent operation number of processes, and a paper carrier control.

Figure 6:
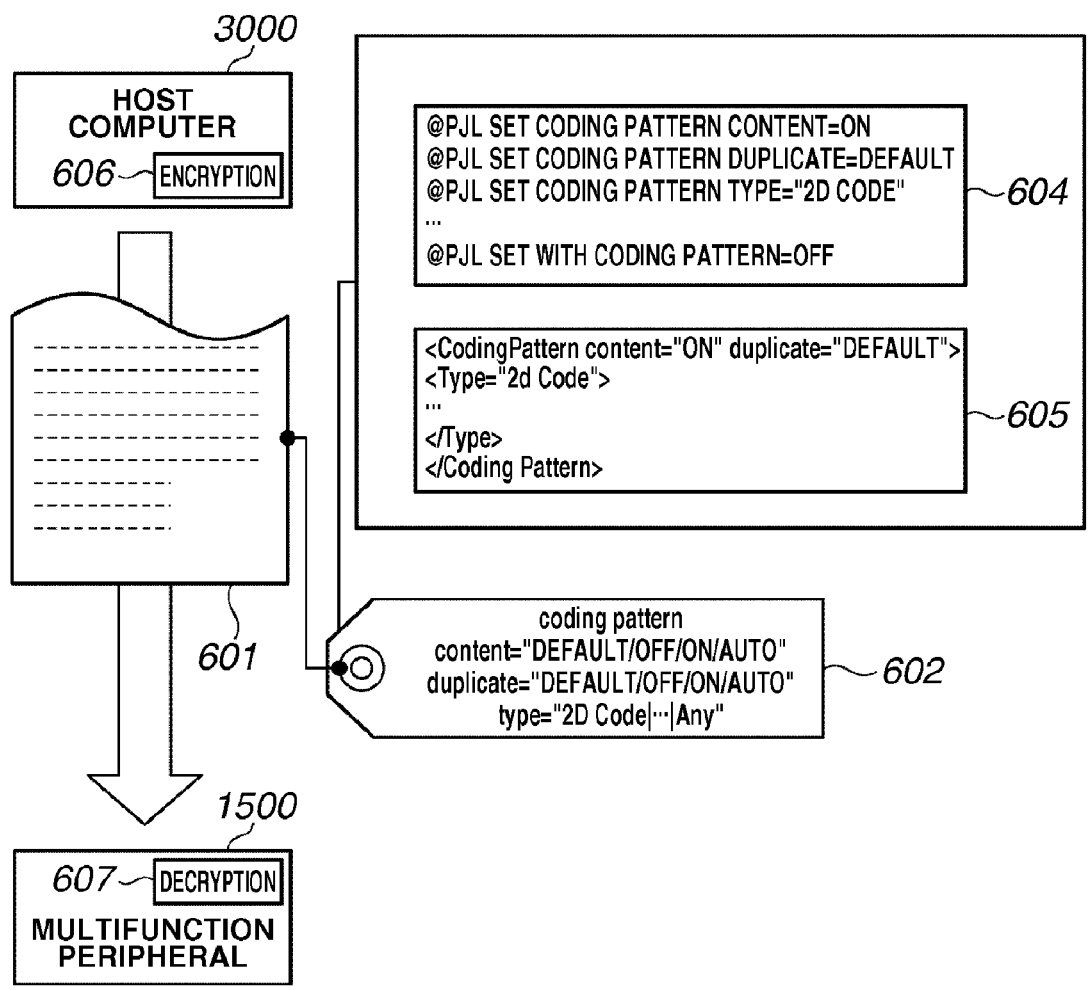
FIG. 6 is a view illustrating the contents of an exemplary tag according to an embodiment.

FIG. 6 shows the contents of the tag data 602 indicating that the print data includes the information embedding binary image data. The tag data 602 is added to the print data 601 when the print data including the information embedding binary image data 601 is transmitted from the host computer 3000 to the multifunction peripheral 1500.

The tag data 602 includes DEFAULT/ON/OFF/AUTO commands indicating functional information of the information embedding binary image data as well as type information of the information embedding binary image data.

The DEFAULT/ON/OFF/AUTO commands, indicating functional information of the information embedding binary image data, are commands instructing the multifunction peripheral to control contents relating to the print data including the information embedding binary image data.

More specifically, the DEFAULT command is a command for instructing the multifunction peripheral to use default settings.

Furthermore, the ON command is a command for instructing the multifunction peripheral to perform optimized processing according to the information embedding binary image data. For example, when the command is ON, the multifunction peripheral changes the compression processing from the lossy compression to the lossless compression.

The OFF command is a command opposed to the ON command. When the command is OFF, the multifunction peripheral does not perform the optimized processing.

Furthermore, the AUTO command is a command for permitting the multifunction peripheral to appropriately change the control according to the print data including the information embedding binary image data.

FIG. 6 shows the tag data 602 including the above-described information indicated by numerals 604 and 605.

Furthermore, the tag data can be encrypted by an encryption section (606) of the host computer 3000 and can be decrypted by a decryption section (607) of the multifunction peripheral 1500.

Next, with reference to FIG. 7, an exemplary user interface for setting the contents of the tag data shown in FIG. 6 will be described. The user interface can be displayed on the CRT 10 of the host computer 3000. A dialog 700 is prepared for information embedding binary image attached original document data. The dialog 700 includes an optimum control menu 701 and a type menu 703. The optimum control menu 701 is usable for controlling functional information. The type menu 703 is usable for designating type information relating to signs, letters, or a specific pattern that can constitute an information embedding binary image.

Figure 7:
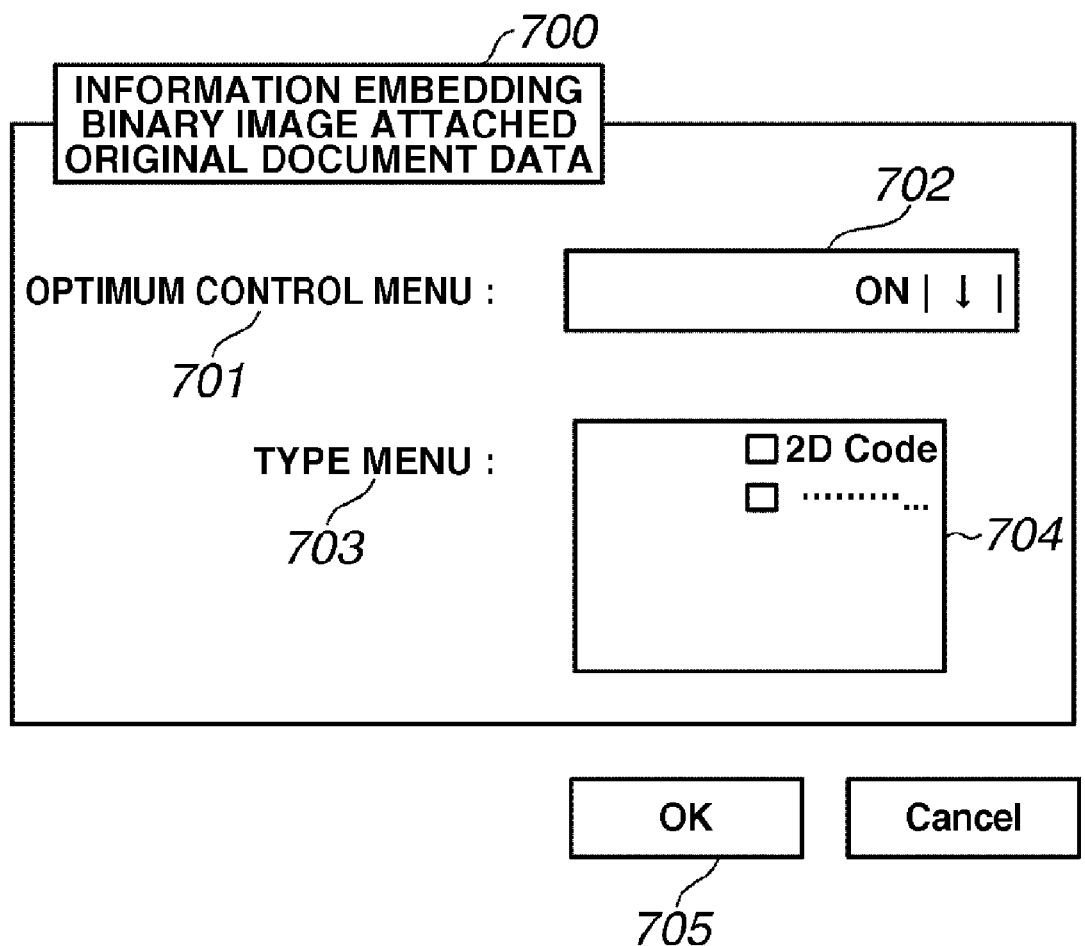
FIG. 7 is a view illustrating an exemplary user interface according to an embodiment.

The optimum control menu 701 enables a user to select one of the DEFAULT/ON/OFF/AUTO commands, as shown in a field 702 of FIG. 7. The pattern type menu 703 shows, in a field 704, a list of type information (e.g., "2D Code") relating to the information embedding binary image data. When an OK button 705 is pressed by a user, all of the settings on the dialog 700 can be fixed and the dialog 700 is closed.

Figure 8:
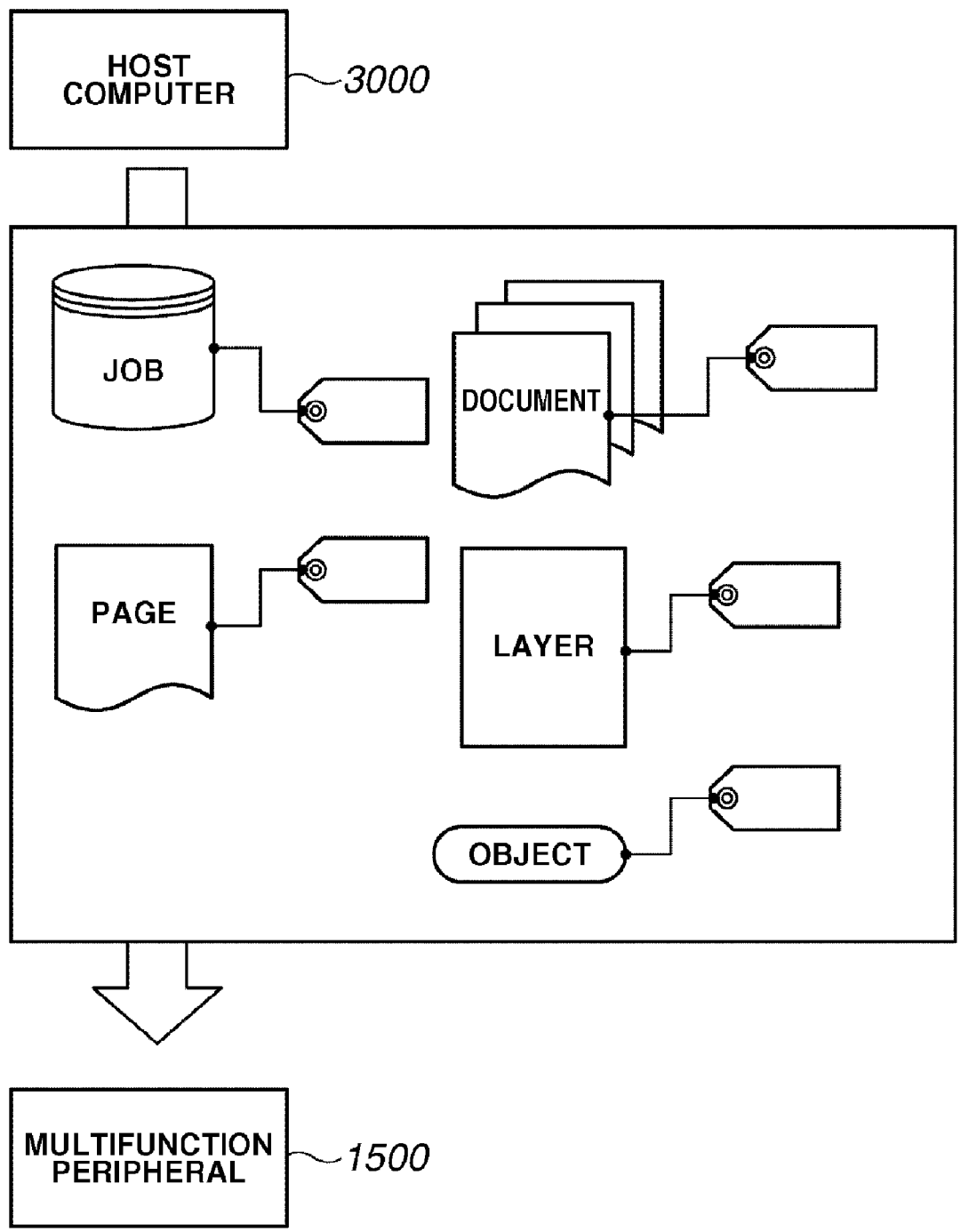
FIG. 8 is a view illustrating an exemplary setting object range according to an embodiment.

FIG. 8 is a view illustrating an exemplary setting object range. When the host computer 3000 transmits the print data including information embedding binary image data to the multifunction peripheral 1500, the host computer 3000 can attach tag data to the print data. The tag data indicates that the print data includes information embedding binary image data.

Figure 9:
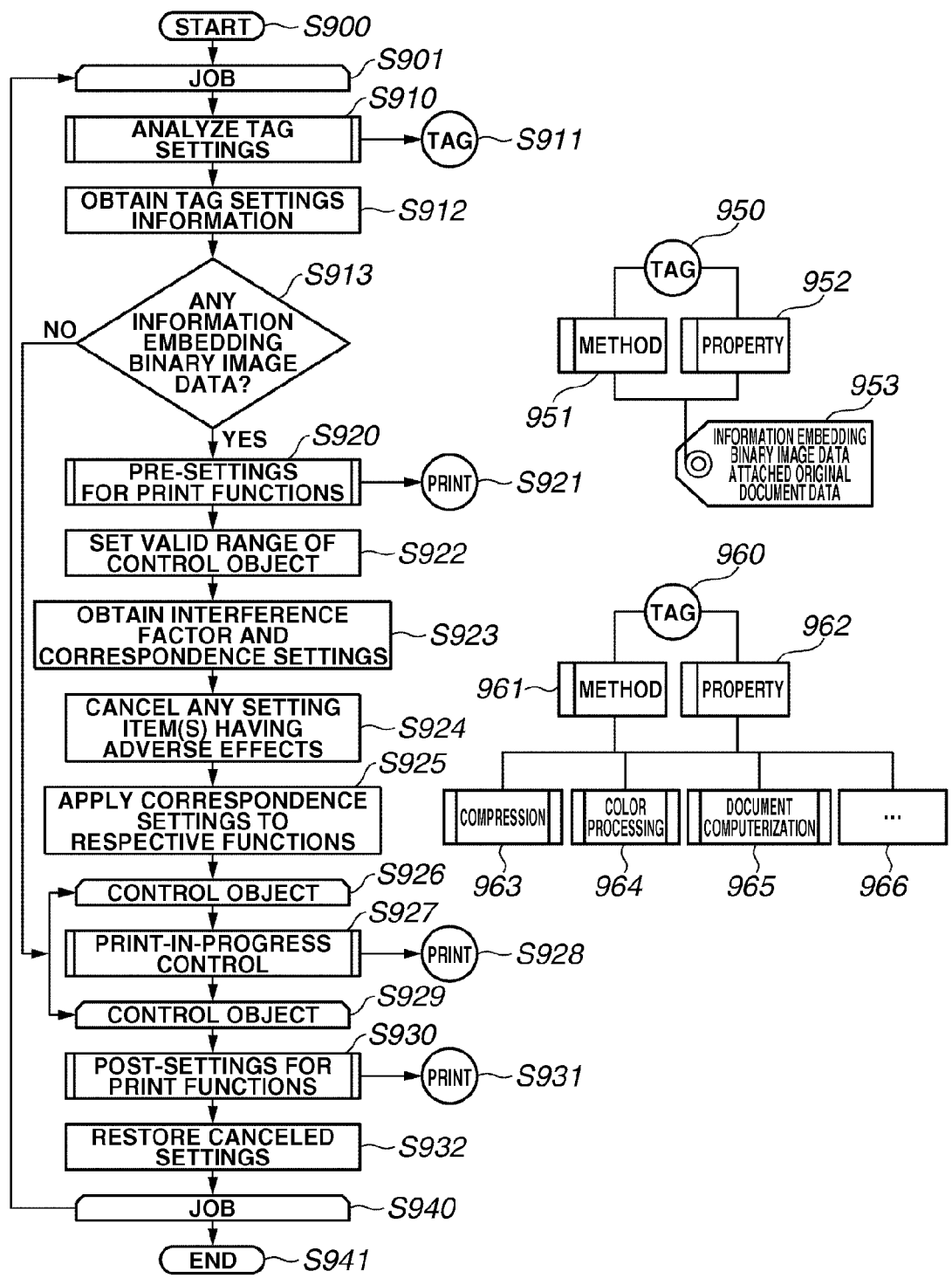
FIG. 9 is a flowchart showing the contents of an exemplary control program stored in a program ROM shown in FIG. 1 according to an embodiment.

FIG. 9 is a flowchart showing one example of the control program, performed by the multifunction peripheral 1500 that can operate in response to the print job data transmitted from the host computer 3000.

In step S900, the multifunction peripheral 1500 starts job processing in response to the print data entered from the host computer 3000 and the processing flow enters into loop processing including step S901 through step S940.

In step S910, the multifunction peripheral 1500 reads the print job data transmitted from the host computer 3000 and separates the tag data from the print data. The multifunction peripheral 1500 analyzes the settings of the tag data.

More specifically, the multifunction peripheral 1500 can analyze the settings of the tag data by operating a tag 953 via a property 952 and a method 951 of a tag class 950. Subsequently, in step S912, the multifunction peripheral 1500 obtains tag settings information.

Then in step S913, the multifunction peripheral 1500 determines, based on obtained tag settings information, whether there is any information embedding binary image data. When no information embedding binary image data is present in step S913, the processing flow proceeds to step S927 in which the multifunction peripheral 1500 executes ordinary print processing.

More specifically, the multifunction peripheral 1500 interprets the print data described by the page description language to create intermediate data. Then, the multifunction peripheral 1500 rasterizes the intermediate data to produce bit map data. Furthermore, the multifunction peripheral 1500 performs lossy compression with an ordinary compression table applicable to the produced bit map data, and stores the lossy compressed data into a memory. Then, the multifunction peripheral 1500 reads the lossy compressed data from the memory, expands the readout data, and performs color conversion and binarization processing, and finally outputs an image printed on a sheet.

On the other hand, when the tag data shows the presence of information embedding binary image data in step S913, the processing flow proceeds to step S920 wherein the multifunction peripheral 1500 performs pre-settings for respective print functions. The pre-settings correspond to a processing routine shown by a print 921 in FIG. 9.

The print 921 is equivalent to a print class 960 that includes each function 966, a compression function 963, a color processing function 964, and a document computerization function 965, according to which various functional settings of the multifunction peripheral are operable via a property 962 and a method 961.

Each function 966 is an arbitrary function other than the compression function 963, the color processing function 964, and the document computerization function 965. If there is a function having an interference factor other than the compression function 963, the color processing function 964, and the document computerization function 965, the function can be operated based on the tag data.

In step S922, based on the contents of the tag data obtainable from the analysis of step S910, the multifunction peripheral 1500 sets a valid range of a control object, which relates to the valid range of a job 802 or a document 803 shown in FIG. 8. Next, in step S923, the multifunction peripheral 1500 obtains an interference factor of each function and correspondence settings, which correspond to the above-described interference factor and correspondence settings for avoiding the interfering state.

In the present exemplary embodiment, the multifunction peripheral 1500 obtains functional information from the tag data. When the functional information includes the settings instructing removal of any interference factor of the information embedding binary image data, the multifunction peripheral 1500 reads correspondence settings stored beforehand and applies the correspondence settings to respective functions.

In this case, if the tag data includes correspondence settings, the multifunction peripheral 1500 can analyze the tag data and can change the settings of respective functions based on the obtained correspondence settings. The correspondence settings can be executed in step S924. In step S924, the multifunction peripheral 1500 removes (deletes), from present settings for respective functions, any setting item(s) that may have adverse effects on the information embedding binary image data. Then, in step S925, the multifunction peripheral 1500 applies correspondence settings to respective functions.

Subsequently, the multifunction peripheral 1500 goes into loop processing 926 with the object range determined in step S922. In the loop processing 926, the multifunction peripheral 1500 executes a printing control (S927) with the correspondence settings applied in step S925. In step S929, the multifunction peripheral 1500 terminates the processing applied to the object range.

In step S930, the multifunction peripheral 1500 performs post-settings applied to respective print functions and executes the print processing for a print job at a print class 931. After the printing of the print job at the print class 931 is accomplished, the multifunction peripheral 1500 performs processing for restoring the settings removed (deleted) in step S924 to the original state (refer to step S932). The multifunction peripheral 1500 executes the aforementioned sequential processing until the processing flow reaches a job loop step S940, and terminates the job at step S941.

As described above, a printer driver in the host computer can perform various settings relating to information embedding binary image data, while the multifunction peripheral performs combination and print output processing. In the present exemplary embodiment, the host computer and the multifunction peripheral are independent devices.

Figure 10:
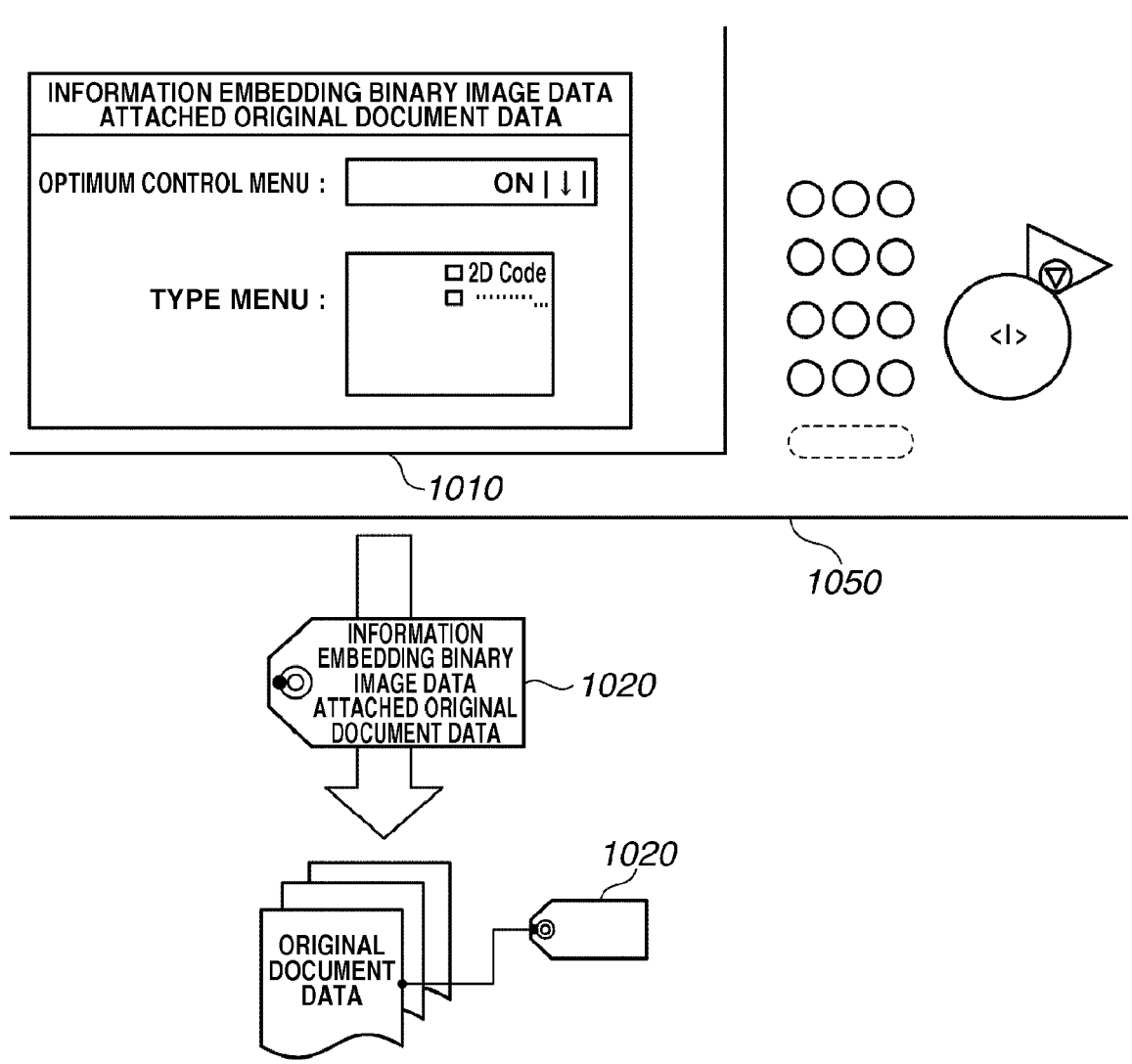
FIG. 10 is a view illustrating an exemplary application applied to a copy function according to an embodiment.

However, the host computer and the multifunction peripheral can be integrated into a single device. FIG. 10 shows an operating section 1050 of an integrated printing apparatus. The operating section 1050 includes a region 1010 through which a user can perform various settings relating to the information embedding binary image data. Thus, according to user's settings entered from the region 1010, the printing apparatus can produce a document accompanied with information embedding binary image data (refer to 1020). The produced document can be later separated into a document and binary image data, and subjected to image processing with reference to the interference factor/correspondence settings (512).

Second Exemplary Embodiment

Compared to the first exemplary embodiment, the second exemplary embodiment is characterized in a method for removing the interference factor relevant to the compression processing (513) in the multifunction peripheral 1500. The second exemplary embodiment is generally identical to the first exemplary embodiment in other arrangement.

According to the aforementioned first exemplary embodiment, the lossy compression having adverse effects on the information embedding binary image data can be changed to the lossless compression.

On the other hand, the second exemplary embodiment can change the compression rate of the lossy compression to a lower value. In other words, the second exemplary embodiment is configured to use a lossy compression having less deterioration in the image quality.

Figure 11:
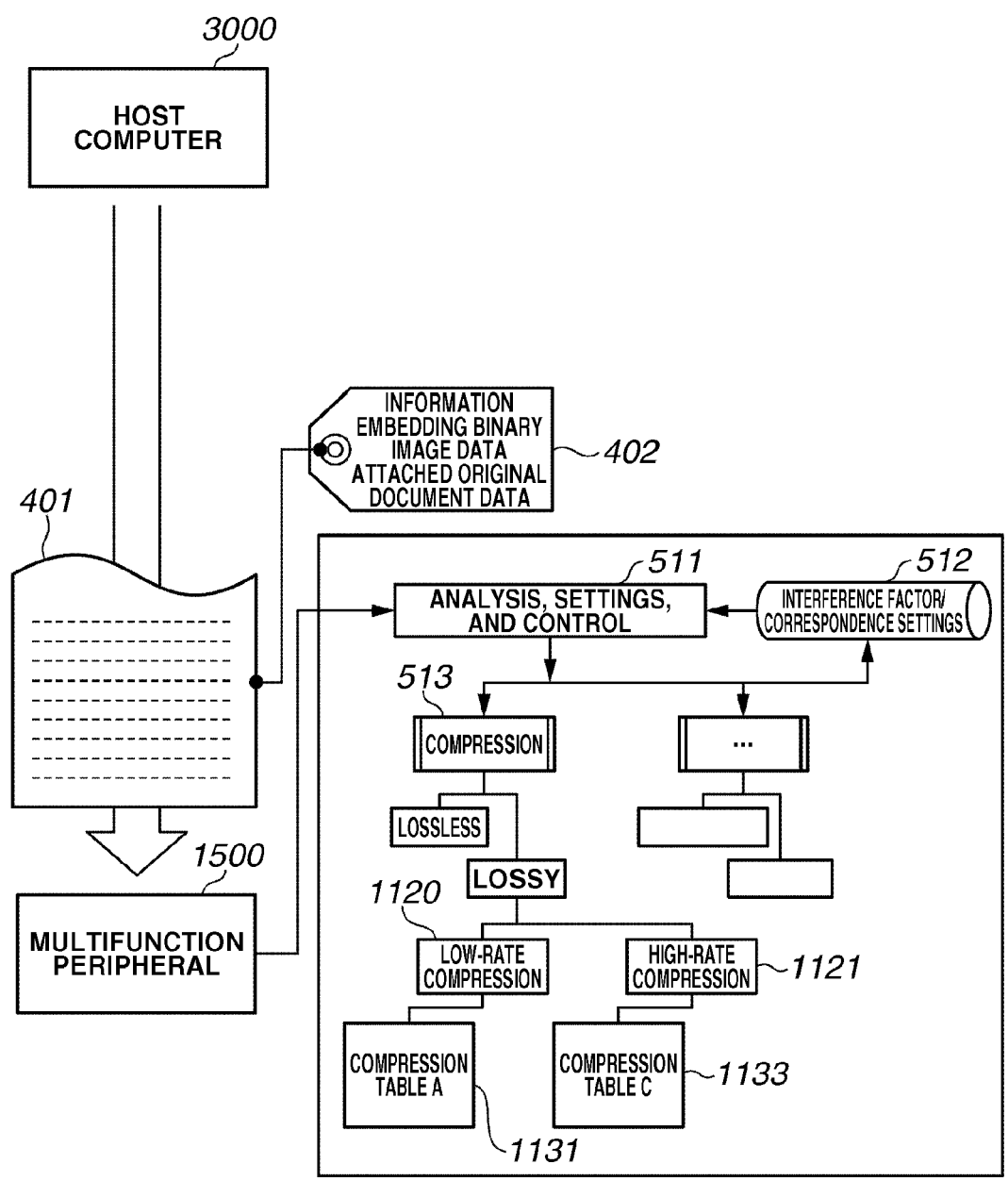
FIG. 11 is a schematic view illustrating exemplary print data reception processing in which a compression rate of lossy compression is switchable according to an embodiment.
Figure 12A:
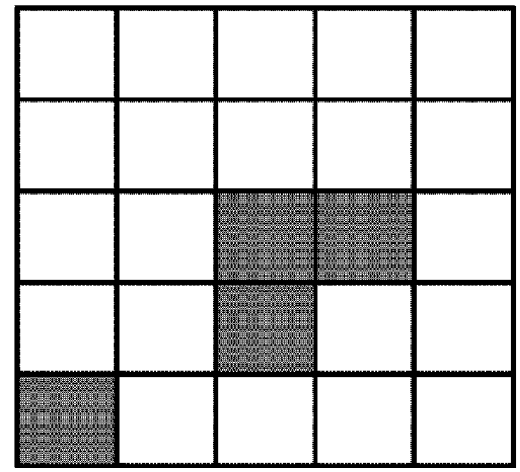
FIG. 12A is a view illustrating exemplary latent pattern data.
Figure 12B:
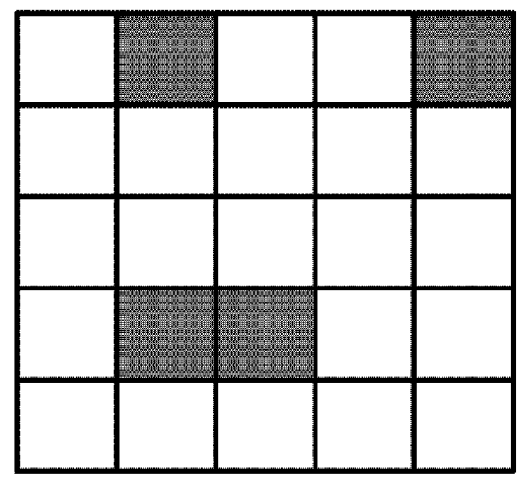
FIG. 12B is a view illustrating exemplary background pattern data.

FIG. 11 is a view illustrating reception processing performed by the multifunction peripheral 1500. The multifunction peripheral 1500 receives print job data including the tag data 402 in addition to the print data 401 including the information embedding binary image data and the original document data. And, the multifunction peripheral 1500 performs the following processing.

More specifically, the multifunction peripheral 1500 executes the analysis, settings, and control processing applied to the received contents (refer to 511), to analyze the tag data 402 and setup respective functions.

The setting processing includes changing the settings of respective functions with reference to a table of interference factor/correspondence settings (512) corresponding to the print data including information embedding binary image data.

A high-rate lossy compression (1121) and a low-rate lossy compression (1120) can be selectively realized by switching the compression table with reference to the contents of the tag data 402.

Hereinafter, the lossy compression having a higher compression rate can be referred to as higher compression or higher compression processing. The lossy compression having a lower compression rate can be referred to as a lower compression or lower compression processing.

The following is a practical method for switching the compression table with reference to the contents of the tag data 402.

When tag data 402 includes no "information embedding binary image data", the multifunction peripheral 1500 performs the high-rate lossy compression (1121). On the other hand, when the tag data 402 includes the "information embedding binary image data", the multifunction peripheral 1500 performs the low-rate lossy compression (1120). In the high-rate lossy compression, the multifunction peripheral 1500 uses a compression table C (1133). In the low-rate lossy compression, the multifunction peripheral 1500 uses a compression table A (1131).

As described above, the present system can adequately select higher compression or lower compression with reference to the tag data, so that the lossy compression can be optimized for each print object.

Third Exemplary Embodiment

Compared to the first exemplary embodiment, the third exemplary embodiment is characterized in that a memory capacity available for the multifunction peripheral and the color of cfip image are taken into consideration as decision factors in the analysis, settings, and control processing (511) applied to the received contents.

The third exemplary embodiment will be described below with reference to FIGS. 13 and 14, wherein information embedding binary image is cfip image. The cfip image data includes 4 (=2×2) types of cfip image data, discriminable by the terms "Color", "Black (mono)", "Whole (full-scale)" and "Partial." More specifically, the cfip image data is whole color cfip image data, or partial color cfip image data, or whole black cfip image data, or partial black cfip image data.

The following is a size relationship among four types of image data, wherein (1) is largest and (3) is smallest.
(1) All color cfip image data
(2) Partial color cfip image data/All black cfip image data
(3) Partial black cfip image data In the first exemplary embodiment and the second exemplary embodiment, no consideration is given to the information relating to "color", "black", "whole", and "partial" in the controls. In contrast, the third exemplary embodiment performs the controls taking the aforementioned information into consideration.

Prior to the description of the processing shown in the flowchart, the following is noted.

First, when an expansion memory is available for the multifunction peripheral, the multifunction peripheral can perform the print output processing for all of the above-described (1) through (3) cfip image data. In this case, the multifunction peripheral performs lossy compression processing with a lower compression rate table.

Furthermore, when the multifunction peripheral can use only the standard memory, the multifunction peripheral can perform print output processing applied only to the cfip image (3) having a small data size. In this case, the multifunction peripheral performs lossy compression processing with a lower compression rate table. On the other hand, the multifunction peripheral cancels the print output processing applied to the cfip images (1) and (2), because of large data size of cfip images (1) and (2) which requires the multifunction peripheral to use a large memory capacity.

Regardless of a memory capacity available for the multifunction peripheral, it is desirable to execute lossy compression processing with a higher compression rate table when only the original document data is printed.

Figure 13:
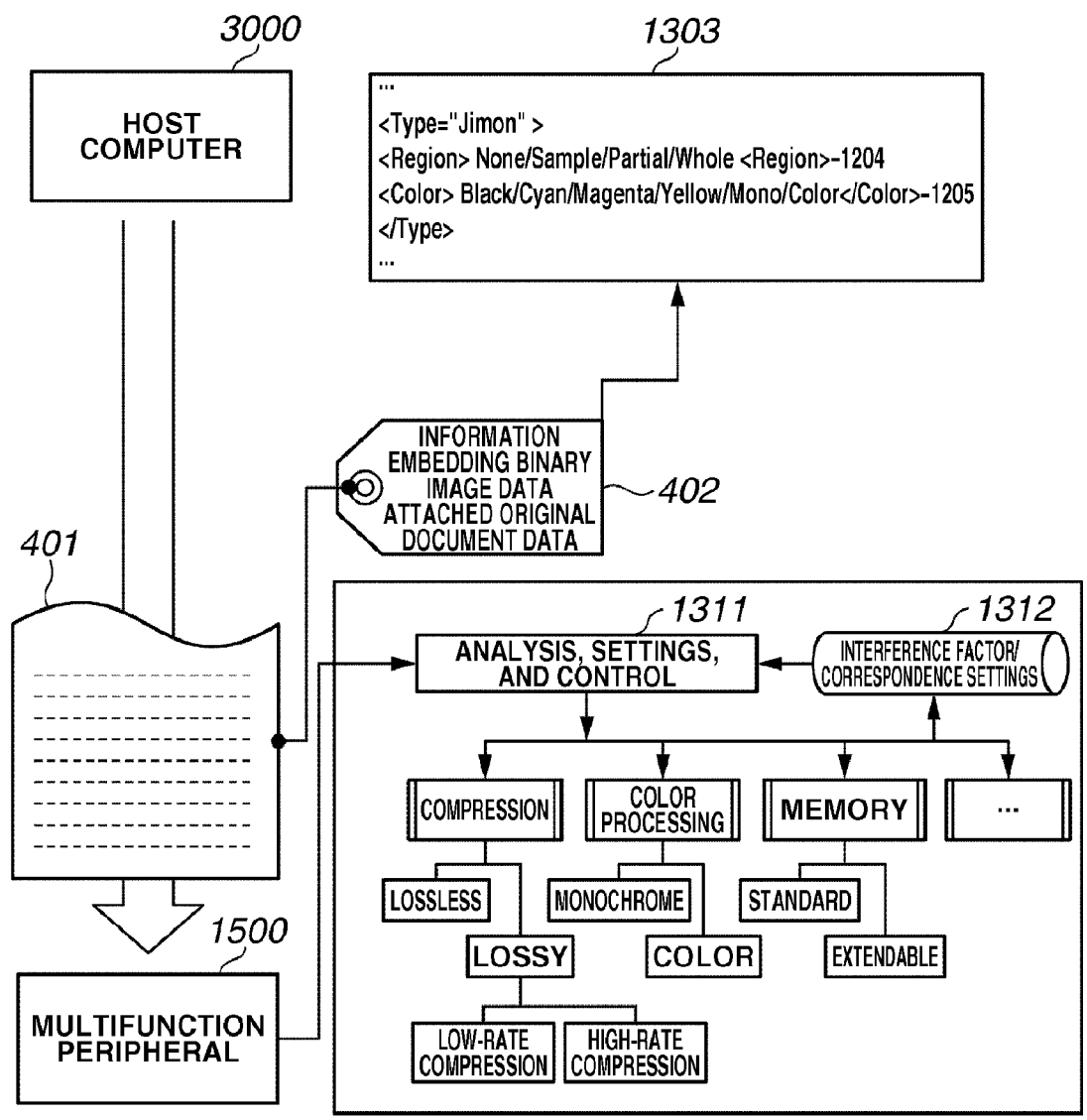
FIG. 13 is a schematic view illustrating the contents of an exemplary tag and a control of the multifunction peripheral according to an embodiment.

In FIG. 13, first, the multifunction peripheral 1500 receives the print job data including the tag data 402, in addition to the print data 401 including information embedding binary image data and original document data.

Then, the multifunction peripheral 1500 executes the analysis, settings, and control processing applied to the received contents (refer to 1311). More specifically, the multifunction peripheral 1500 analyzes the tag data 402 and performs settings of respective functions.

In the settings, the multifunction peripheral 1500 refers to interference factor/correspondence settings (1312) on the table, and changes the settings of each image processing with reference to the print data including the information embedding binary image data.

Exemplary contents 1303 of the tag data 402 include "Region information" showing a region occupied by the cfip image. The "Region information" can take practical values of No (including no cfip image), Partial (partial cfip image), and Whole (whole cfip image). Furthermore, "Color information" showing the color of the cfip image can take practical values of MONO, and Color (cyan, magenta, etc).

Figure 14:
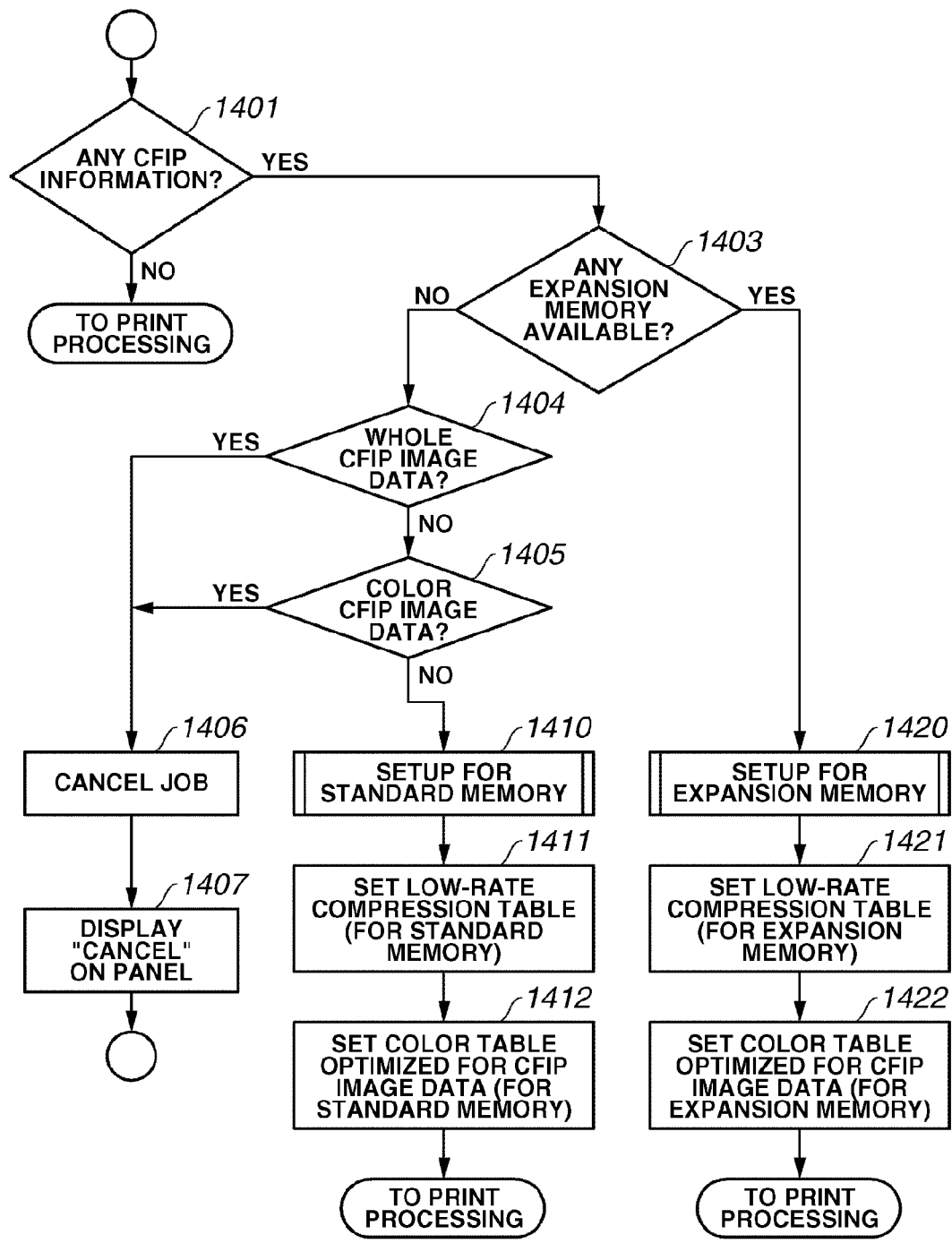
FIG. 14 is a flowchart showing a detailed control of the multifunction peripheral according to an embodiment.
Figure 15A:
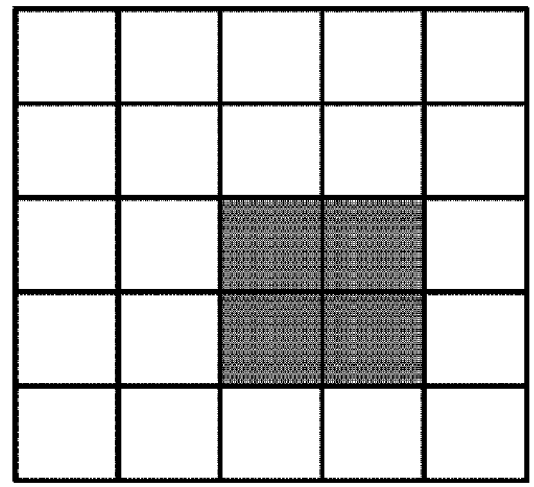
FIG. 15A is a view illustrating exemplary latent pattern data which is lossy compressed, expanded, and binarized.
Figure 15B:
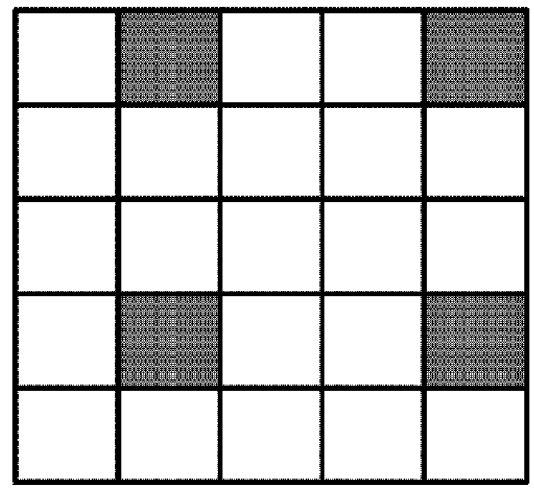
FIG. 15B is a view illustrating exemplary background pattern data which is lossy compressed, expanded, and binarized.

FIG. 14 is a flowchart showing expansion processing performed by the CPU in the multifunction peripheral 1500. First, the multifunction peripheral 1500 receives print job data and determines, based on the tag data, whether the print data includes any cfip image data (refer to step 1401).

When the print data does not include cfip image data ("No" in step 1401), the multifunction peripheral 1500 executes ordinary print processing. In the ordinary print processing, the multifunction peripheral 1500 converts the original document data contained in the print data into bit map data. Then, the multifunction peripheral 1500 applies high-rate lossy compression to the converted bit map data and stores the compressed data into a memory. Thereafter, the multifunction peripheral 1500 expands the data stored in the memory, and applies color conversion to the expanded data with an ordinary color conversion table to print a resultant image on a sheet.

When the print data includes cfip image data ("Yes" in step 1401), the processing flow proceeds to step 1403 in which the multifunction peripheral 1500 determines whether there is any expansion memory. When the expansion memory is available ("Yes" in step 1403), the processing flow proceeds to step 1420. Then, the multifunction peripheral 1500 performs setup processing corresponding to the expansion memory (refer to step 1420).

More specifically, the multifunction peripheral 1500 sets a low-rate compression table (refer to step 1421). Furthermore, the multifunction peripheral 1500 sets a color conversion table optimized for the color of the cfip image data so that the color conversion can be properly performed for the color of the cfip image data (refer to step 1422). In other words, when there is a large or sufficient memory capacity available, the multifunction peripheral 1500 selects the low-rate lossy compression.

In the present exemplary embodiment, the standard memory has a memory capacity of 1 GB and the expansion memory has a memory capacity of 0.5 GB. Accordingly, an available memory capacity is 1.5 G at maximum.

When expansion memory is not available ("No" in step 1403), the processing flow proceeds to step 1404 in which the multifunction peripheral 1500 determines whether the cfip image data occupies the entire area of the original document data. When the cfip image data occupies the entire area of the original document data, the data amount is very large. Therefore, applying a low-rate lossy compression to the cfip image data is not effective to reduce the data size and a relatively large memory capacity will be required for the compression.

Therefore, if the cfip image data occupies the entire area of the original document data ("Yes" in step 1404), the processing flow proceeds to step 1406 in which the multifunction peripheral 1500 cancels the job. The information, such as a message, relating to the canceled job can be displayed on a panel of the multifunction peripheral or/and on a display unit of the host computer.

When the cfip image data occupies part of the original document data ("No" in step 1404), the processing flow proceeds to step 1405 in which the multifunction peripheral 1500 determines whether the cfip image data is color data or black (i.e., monochrome) data. When the cfip image data is color data, the data amount is very large. Therefore, applying a low-rate lossy compression to the color cfip image data is not effective to sufficiently reduce the data size.

Therefore, if the cfip image data is color data ("Yes" in step 1405), the processing flow proceeds to step 1406 in which the multifunction peripheral 1500 cancels the job. The information, such as a message, relating to the canceled job can be displayed on a panel of the multifunction peripheral or/and on a display unit of the host computer (refer to step 1407).

When the cfip image data is black data ("No" in step 1405), the processing flow proceeds to step 1410 in which multifunction peripheral 1500 performs setup processing corresponding to the standard memory (refer to step 1410). More specifically, the multifunction peripheral 1500 sets a low-rate compression table (refer to step 1411). Furthermore, the multifunction peripheral 1500 sets a color conversion table optimized for the color of the cfip image data so that the color conversion can be properly performed for the color of the cfip image data (refer to step 1412).

After accomplishing the aforementioned settings for the compression table, the multifunction peripheral 1500 executes the following processing.

First, the multifunction peripheral 1500 combines the cfip image data and the original document data in units of 32 pixels×32 pixels, and applies lossy compression to the composite image data with the preset compression table. Then, the multifunction peripheral 1500 successively stores the lossy compressed composite image data into a memory in units of 32 pixels×32 pixels.

When the lossy compressed composite image data corresponding to one page is completely stored in the memory, a paper feeding section starts supplying a paper (i.e., sheet). When the sheet arrives at a predetermined position, the multifunction peripheral 1500 starts the processing for reading, from the memory, the lossy compressed composite image data in units of 32 pixels×32 pixels. Then, the multifunction peripheral 1500 performs expansion processing applied to the readout composite image data and applies color conversion to the expanded data with the preset color conversion table to print a resultant image on the sheet.

Fourth Exemplary Embodiment

A fourth exemplary embodiment is characterized in the way of producing print data from two or more original document data to be combined with mutually different cfip image data and also characterized in the way of producing the tag data.

In general, when two or more cfip image data are present, it may be considered that no problem will arise if the tag data is independently prepared for each cfip image data to describe the information relevant to each cfip image data.

However, there is a problem that printing of some original document data is canceled whereas printing of other original document data is acceptable.

For example, when the original document data to be combined with black-and-white partial cfip image data can be printed as composite image data, the printing of original document data to be combined with color whole cfip image data may be canceled.

This is very inconvenient when a user wants to obtain a print set of plural original document data.

Hence, in the fourth exemplary embodiment, the information contained in the tag data is limited to only one type, even when plural original document data are combined, and when the cfip image data combined with respective original document data are differentiated.

More specifically, it is now supposed that cfip image data 1 (whole color cfip image data) is scheduled so as to be combined with original document data 1, and there is cfip image data 2 (partial black cfip image data) to be combined with original document data 2. Furthermore, it is instructed to combine the original document data 1 with the original document data 2.

In such a case, the present exemplary embodiment produces print data including two original document data 1 and 2 and two cfip image data 1 and 2, and produces tag data including the information indicating the whole cfip image data. As a result, the present exemplary embodiment can entirely cancel the print processing of the print data. Thus, the present exemplary embodiment can eliminate the aforementioned drawback (i.e., the problem such that part of the original document data is printed undesirably).

In the production of the tag data, the following rules (i.e., priority relationships) can be employed.

(1) Color>Black (2) Whole>Partial>No

According to the rules, when the cfip image data includes both color cfip image data and black cfip image data, the host computer produces a tag data including information that the cfip image data is color cfip image data.

In the present exemplary embodiment, application of this rule is not limited to the combination of plural original document data to which mutually different cfip image data are combined. For example, the same rule can be applied to a tag data attached to single original document data containing plural pages to which mutually different cfip image data are combined.

Other Exemplary Embodiments

The present invention can be applied to a system including a plurality of devices (e.g., a computer, interface devices, a reader, and a multifunction peripheral), or can be applied to a single apparatus (such as, a copying machine, a multifunction peripheral, or a facsimile apparatus).

Furthermore, software program code for realizing the functions of the above-described exemplary embodiments can be supplied, via a storage medium (or a recording medium), to a system or an apparatus. A computer (or CPU or MPU) in the system or the apparatus can read the program code stored in the storage medium and can execute the readout program.

In this case, the program code read out from the storage medium can realize the functions of the exemplary embodiments. The equivalents of programs can be used if they possess comparable functions. Accordingly, when the functions or processes of the exemplary embodiments are realized by a computer, program code installed in the computer and a recording medium storing the program are used to implement the present invention.

In other words, the present invention encompasses a computer program that can realize the functions or processes of the exemplary embodiments or any recording medium that can store the program. In this case, the type of program can be any one of object code, interpreter program, and OS script data.

A recording medium supplying the program can be selected from any one of a flexible disk, a hard disk, an optical disk, a magneto-optical disk, an MO, a CD-ROM, a CD-R, a CD-RW, a magnetic tape, a nonvolatile memory card, a ROM, and a DVD (DVD-ROM, DVD-R).

The method for supplying the program includes accessing a home page on the Internet using the browsing function of a client computer, when the home page allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different home pages. Namely, the present invention encompasses WWW servers that allow numerous users to download the program files so that the functions or processes of the present invention can be realized on their computers.

Furthermore, encrypting the programs of the present invention and storing the encrypted programs in a CD-ROM or comparable recording medium is a practical method when the programs of the present invention are distributed to the users. The authorized users (i.e., users satisfying predetermined conditions) are allowed to download key information from a home page on the Internet. The users can decipher the programs with the obtained key information and can install the programs on their computers. When the computer reads and executes the installed programs, the functions of the above-described exemplary embodiments can be realized.

Furthermore, not only the functions of the above-described exemplary embodiment can be realized by a computer that executes the programs, but also an operating system (OS) running on the computer can execute part or all of the actual processing based on instructions of the programs.

Furthermore, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-252190 filed Aug. 31, 2005, which is hereby incorporated by reference herein in its entirety.

What is claimed is:

1. An information processing apparatus for sending print data to either a printing apparatus having sufficient memory to print printing the print data even if the print data includes color copy forgery inhibited pattern image data, or to a printing apparatus having sufficient memory to print the print data if the print data includes monochrome copy forgery inhibited pattern image data, but not having sufficient memory to print the print data if the print data includes color copy forgery inhibited pattern image data, the information processing apparatus comprising:

a processor programmed to control:

a print data generating unit for generating print data including copy-forgergy-inhibited-pattern image data;

an additional information generating unit for generating additional information including color information indicating whether the included copy-forgery-inhibited-pattern image data is color or monochrome, and including region information indicating whether the copy-forgery-inhibited-pattern image data is a full scale image or a partial image; and a sending unit for sending the generated print data with the generated additional information, wherein the copy-forgery-inhibited-pattern image data comprises a latent image and a background image, the latent image being an image that is reproduced more clearly via copying than the background image, and wherein the additional information generating unit generates the additional information including the color information indicating the included copy-forgery-inhibited-pattern image data is color when the copy-forgery-inhibited-pattern image data includes both color copy-forgery-inhibited-pattern image data and monochrome copy-forgery-inhibited-pattern image data.

2. A method for sending print data to either a printing apparatus having sufficient memory to print the print data even if the print data includes color copy forgery inhibited pattern image data, or to a printing apparatus having sufficient memory to print the print data if the print data includes monochrome copy forgery inhibited pattern image data, but not having sufficient memory to print the print data if the print data includes color copy forgery inhibited pattern image data, the method comprising:

generating print data including copy forgery inhibited pattern image data;

generating additional information including color information indicating whether the included copy forgery inhibited pattern image data is color or monochrome, and including region information indicating whether the copy-forgery-inhibited-pattern image data is a full scale image or a partial image; and sending the generated print data with the generated additional information, wherein the copy-forgery-inhibited-pattern image data comprises a latent image and a background image, the latent image being an image that is reproduced more clearly via copying than the background image, and wherein the generated additional information includes color information that indicates the included copy forgery inhibited pattern image data is color when the copy forgery inhibited pattern image data includes both color copy forgery inhibited pattern image data and monochrome copy forgery inhibited pattern image data.

3. A non-transitory computer readable medium having recorded thereon a program for causing a computer to execute a method for sending print data to either a printing apparatus having sufficient memory to print the print data even if the print data includes color copy forgery inhibited pattern image data, or to a printing apparatus having sufficient memory to print the print data if the print data includes monochrome copy forgery inhibited pattern image data, but not having sufficient memory to print the print data if the print data includes color copy forgery inhibited pattern image data, the method comprising:

generating print data including copy forgery inhibited pattern image data;

generating additional information including color information indicating whether the included copy forgery inhibited pattern image data is color or monochrome, and including region information indicating whether the copy-forgery-inhibited-pattern image data is a full scale image or a partial image; and sending the generated print data with the generated additional information, wherein the copy-forgery-inhibited-pattern image data comprises a latent image and a background image, the latent image being an image that is reproduced more clearly via copying than the background image, and wherein the generated additional information includes color information that indicates the included copy forgery inhibited pattern image data is color when the copy forgery inhibited pattern image data includes both color copy forgery inhibited pattern image data and monochrome copy forgery inhibited pattern image data.

* * * * *